May 5, 1931.  E. A. SPERRY  1,803,876
COMBUSTION ENGINE LOCOMOTIVE
Filed Jan. 20, 1922   4 Sheets-Sheet 1
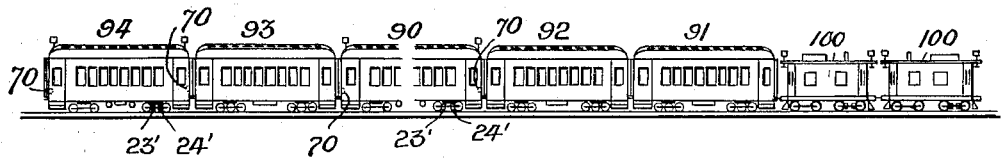
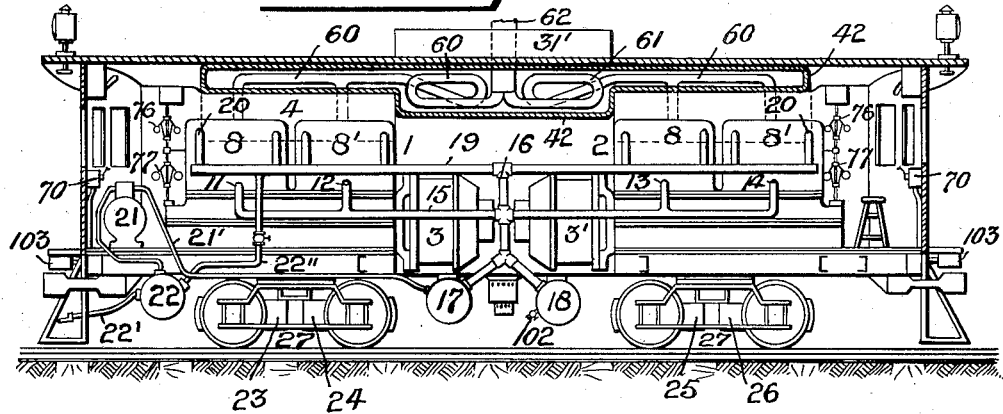
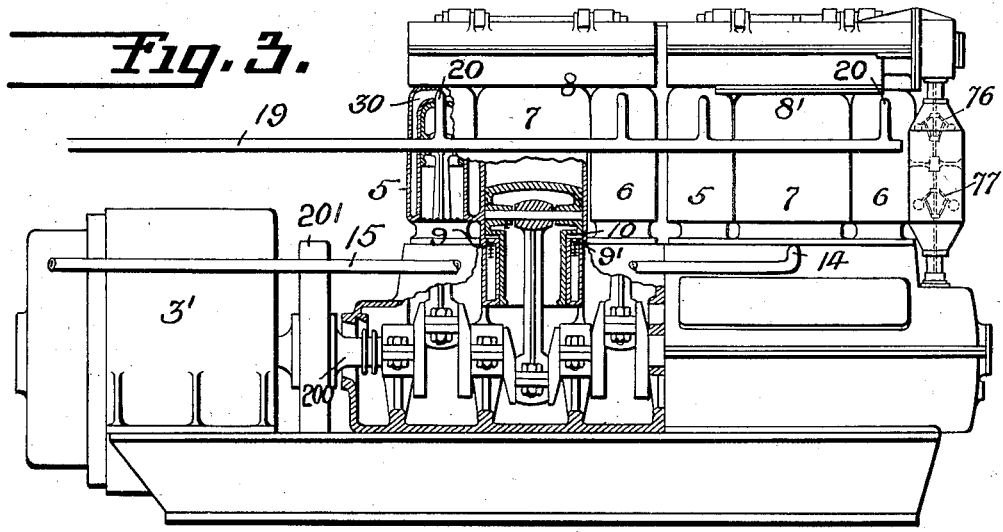
Inventor
ELMER A. SPERRY.
By his Attorney
Herbert H. Thompson

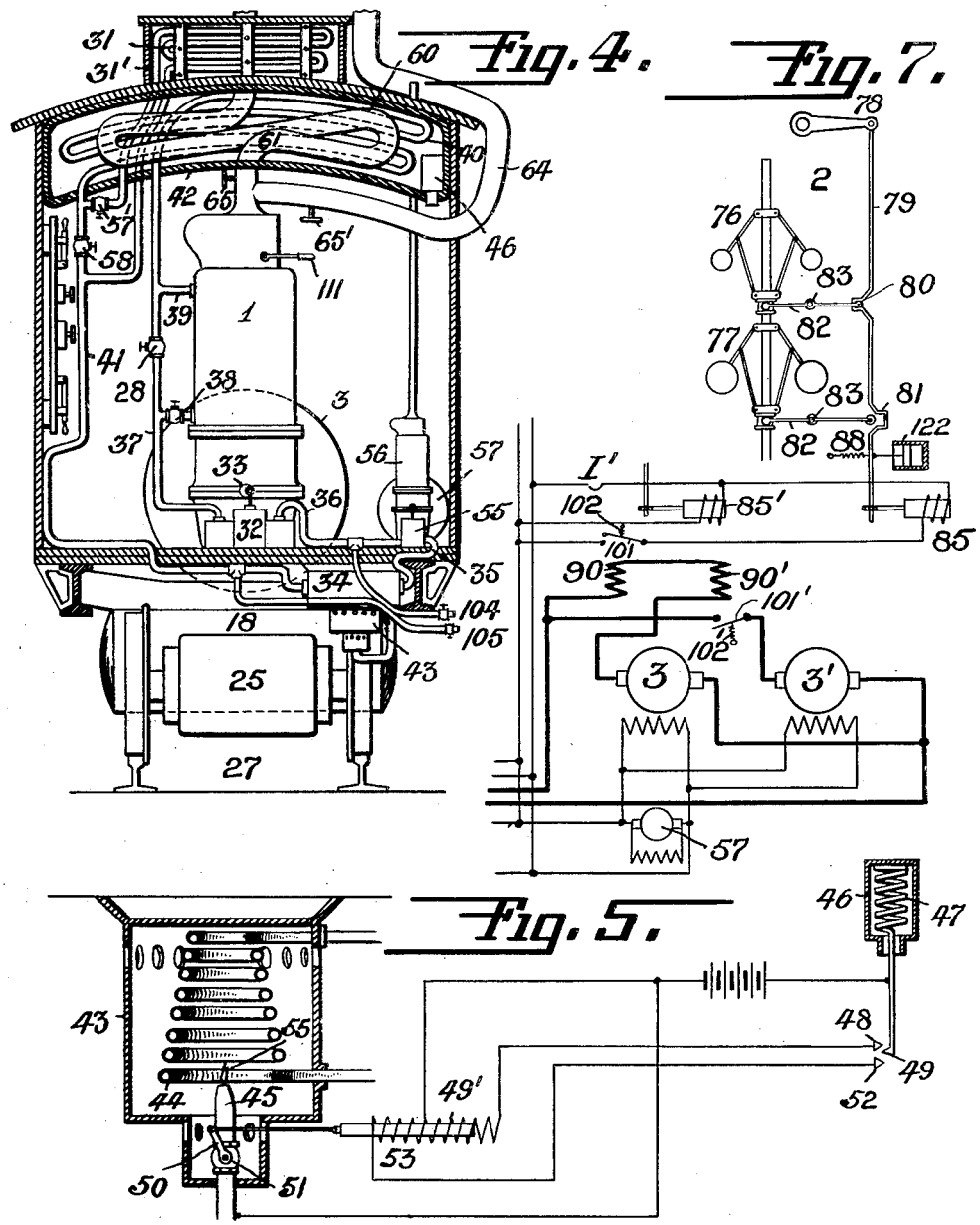

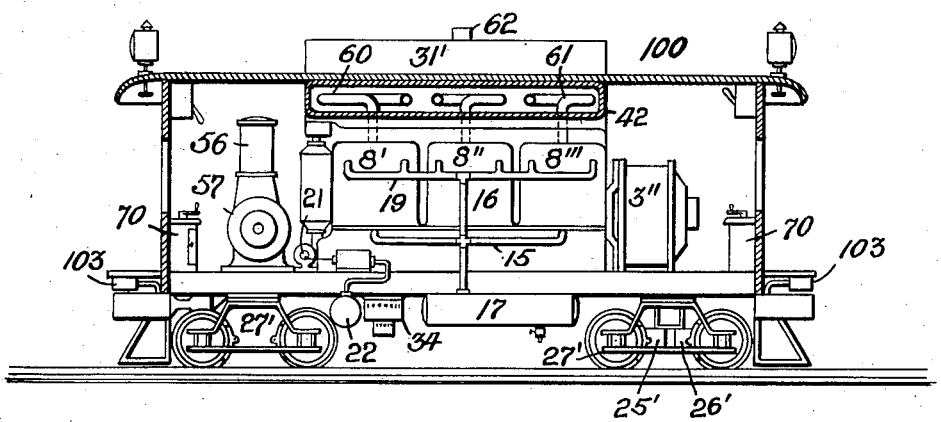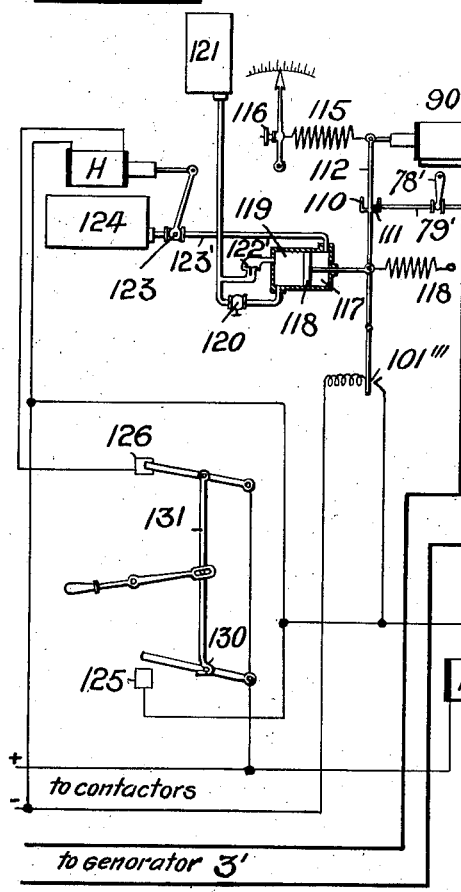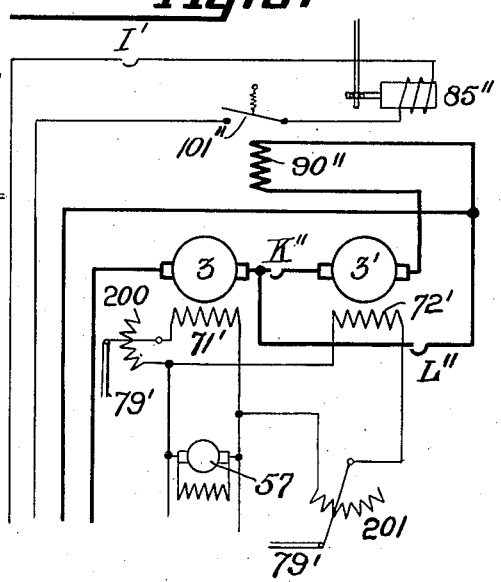

Patented May 5, 1931

1,803,876

UNITED STATES PATENT OFFICE

ELMER A. SPERRY, OF BROOKLYN, NEW YORK, ASSIGNOR TO SPERRY DEVELOPMENT COMPANY, OF DOVER GREEN, DELAWARE, A CORPORATION OF DELAWARE

COMBUSTION ENGINE LOCOMOTIVE

Application filed January 20, 1922. Serial No. 530,687.

This invention relates to an electric combustion engine for locomotives or auto-motive power plants for the propulsion of trains.

One of the objects of the invention is to design the control of the locomotives so that the train may be controlled from any point on the train as readily as the standard multiple unit electric motor car train today.

A further object of the invention is the adaptation of a compound Diesel or heavy oil engine, such as shown in my U. S. Patent No. 1,325,810, of December 23, 1919 to electric locomotive service, including the provision of means for maintaining the crude or heavy oil in the proper state for feeding to the engines, the provision of an air-brake supply system, etc.

My compound combustion engine possesses a special advantage for automotive vehicles for the following reasons;

First. It expands the combustion gas to a much lower point than the ordinary combustion or Diesel engine, thereby securing both much greater efficiency and economy and also a very nearly silent exhaust without the use of mufflers, and Second. The engine employs super-charging i. e., pre-compression of the intake air prior to introduction into the combustion cylinder. This may be extended to such an extent as to insure all combustion going forward in the presence of excess oxygen, so that no smoke or disagreeable fumes are produced at the exhaust.

Further objects of the invention will appear as the description proceeds.

Referring to the drawings in which what I now consider the preferred forms of my invention are shown, Fig. 1 is a diagrammatic view of the train with two of my locomotives attached thereto, the train being designed to be controlled from either end and having one or more motor cars incorporated therein.

Fig. 2 is an interior view of another form of locomotive especially designed for hauling trail cars only.

Fig. 3 is an elevation of one power plant unit of said locomotive.

Fig. 4 is an interior transverse view of said locomotive.

Fig. 5 is a diagrammmatic view of the auxiliary heating system employed for the fuel.

Figs. 7, 9 and 10 are wiring diagrams of modified forms of generator control.

Fig. 8 is an interior view of the locomotive adapted especially for use with a multiple unit motor car train, such as shown in Fig. 1.

Figure 6:
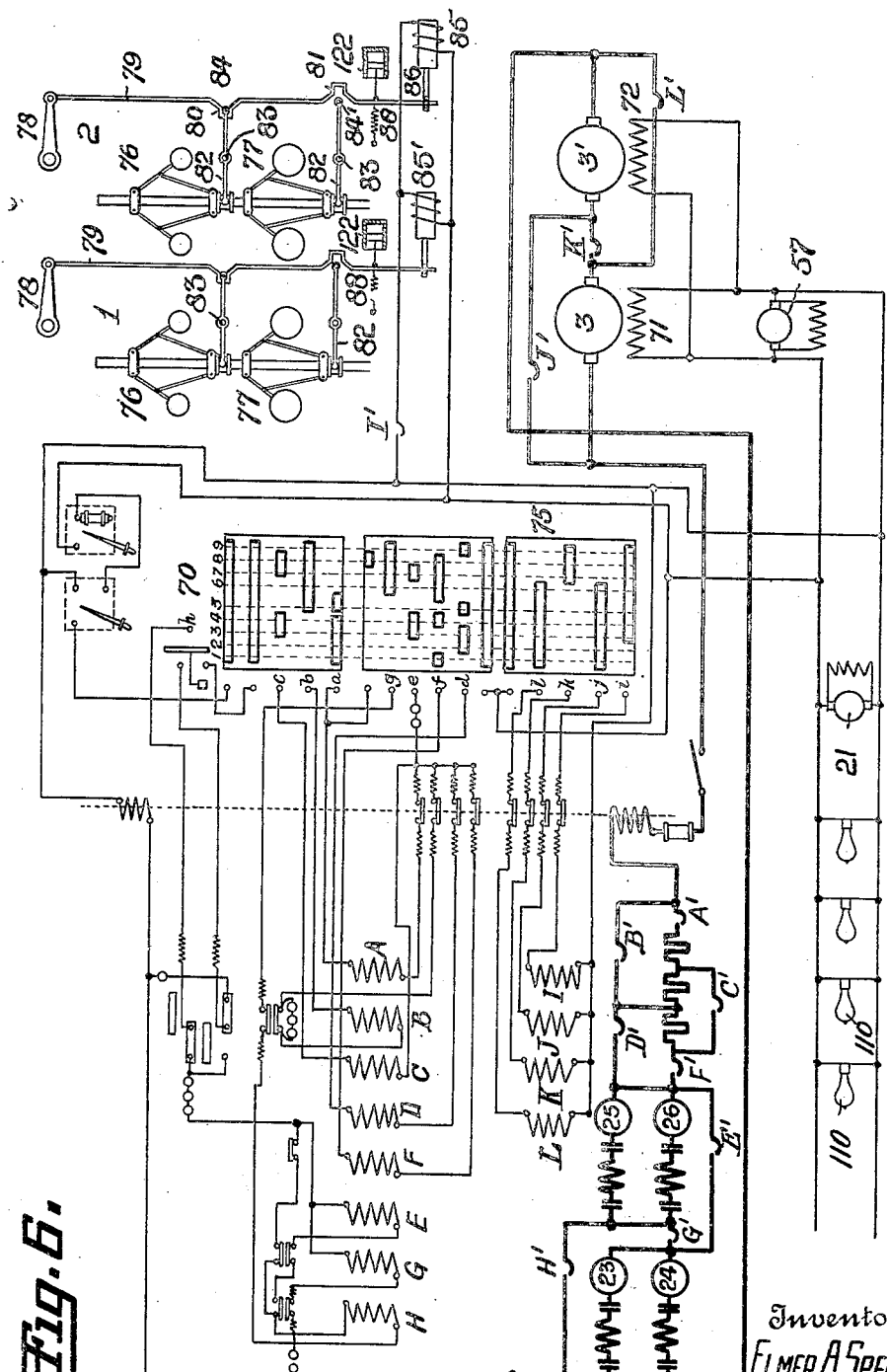
Fig. 6 is a wiring diagram illustrating an electrical system of control employed with my invention.

The locomotive illustrated in Figs. 2, 3, 4 and 5 comprises essentially one or more power plant units, in the present instance shown as two units 1 and 2, each made up of a generator 3 or 3′, and a multiple cylinder oil engine 4.

The form of oil engine I prefer to use is a plurality of compound engine units, each composed of a pair of high pressure cylinders, 5 and 6, on either side of a central low pressure cylinder 7. For details of such engine, I may refer to my aforesaid patent. Two such units 8 and 8′ are employed to drive the one generator 3, the engines, generator and fly wheel 201 if employed, being on the same crank shaft 200. Four compound units are employed on the locomotive illustrated. In such engines, the lower portion of the low pressure piston 10 is employed as an air compressor to supply compressed air to the induction valve of the high pressure cylinders, the intake and outflow valves being shown at 9, 9′. The pipes leading out from the pumps are shown at 11, 12, 13 and 14, said pipes being connected to a common pipe 15 and from thence to one or more reservoirs 17 and 18.

The air system is shown as connected to the induction valves of each high pressure cylinder, through the vertical pipe 16 rising from pipe 15 and reservoirs 17 and 18 and connected to the transverse pipe 19, which in turn is connected through vertical pipes 20, to each of the induction valves (not shown). The air is also used to start the engine by manipulating handle 111 as described in my copending application, Serial No. 462,108 filed April 18, 1921.

I may employ the air compressed by said pumps, not only for supplying the induction valves and starting, but also for the air-brake system of the locomotive and train. If desired, the pumps may be designed to supply sufficient air at sufficient pressure for the entire train line, (50 to 100 lbs. per sq. in.). However, in order to avoid the necessity of complicated means for adjusting the amount of air supplied by the pumps to fit the needs of trains of various lengths, I prefer to provide an auxiliary air compressor 21 which may be electrically driven. Preferably, said auxiliary pump is supplied with compressed air from the tanks 17 and through pipe 21', or it may be on an entirely independent system. It will be understood that said pump is of any ordinary standard design of electrically driven air pump, designed to be brought in automatically whenever the air pressure in the train line falls below a predetermined amount. The air pump 21 is shown as supplying air to the train line 22' through a reservoir 22, from which air may be taken for starting the engine through valved pipe 22''.

The locomotive is shown as equipped with a plurality of driving motors 23, 24, 25 and 26, two on each truck 27, so as to secure a maximum tractive effort.

The compound engine of the type I prefer to employ is adapted to use the heaviest kind of fuel oils, provided they can be supplied to the induction valves in the liquid form. Such oils however, will not flow properly at a low temperature and I therefore prefer to provide means for maintaining it or in fact any oil used for any purpose in or about the locomotive under temperature control, preferably automatically, so as either to cool or warm it as best fitted to the required service. To illustrate, in the present instance I show means adapted to keep the fuel oil supply warm enough to flow freely under pressure. For this purpose, I may employ the heat of the engine itself for heating the fuel oil when the engine is running. When the engine is idle on the other hand, I provide auxiliary means for temperature control of the oil. In the system shown, the oil heating system preferably is intimately tied up with the liquid cooling system for the engine, though not limited to this combination so that the two will be described together for the sake of brevity.

It will be understood that the engine is provided with the usual water jackets 30 for cooling the same. Water is circulated through the jackets and through the cooling coils 31 in an open compartment 31' in a manner similar to the usual cooling system for automobiles. As shown, a pump 32 driven from the cam shaft 33 of the engine causes circulation of the water from the lower tank 34 through pipe 35, 36, through the pump 32, then through pipe 37 and into the water jackets at valve 38, and out again from the jackets at 39, thence upwardly through coils 40 and 31 and thence downwardly through pipe 41 to the lower reservoir 34. Coils 40 it should be noted are within the large fuel tank 42 extending along the roof of the locomotive, so that under certain conditions the hot water from the engine may first pass through the fuel oil, thereby heating the same, and then to the exposed cooling coils 31 on the roof of the locomotive.

I may also provide an auxiliary means for both controlling the temperature as by heating and circulating the oil independently before or after either main engine is started. One form of heating means is shown as consisting of a stove 43 or a burner, underneath the tank 34. Said burner is shown as comprising (Fig. 5) a coil 44 within the stove 43 and a burner 45 of any desirable form adapted to heat the water circulating through the coils 44. Said burner may be supplied with oil or gas and is shown as automatically brought into operation in response to the temperature of the oil or when it falls below a predetermined amount and vice versa. For this purpose, I have shown diagrammatically a thermostat box 46 located within the fuel tank. A thermostatically operated coil 47 is adapted to make contact between the points 48 and 49 when the temperature of the oil is too low, thereby exciting the coil 49' and rotating the arm 50 which opens wide the valve 51 producing a large flame enveloping coils 44. When the oil tends to get too warm, the thermostat expands and contact with point 52 is completed, exciting coil 53 and reducing the flame to a pilot light 50'. The water in this instance is circulated by the pump 55 suitably driven as by the auxiliary gasoline or oil engine 56, which also preferably operates a small generator 57, adapted to drive the air-brake motor 20 and to excite the fields of the main generators 3 and 3'. Said auxiliary generator may also be used to light the train as indicated at 110 (Fig. 6), and to supply low voltage current for the control circuits of the multiple unit control system. When the main engine is not running and it is desired to keep the oil hot, except in winter, one may not need to warm the entire water jacket system and especially the cooling coils 31 on the top of the locomotive. I therefore provide means for shutting off said system when the locomotive is idle. To this end, I have shown valves 28 and 38 for shutting off the water jacket from the engine and the valves 57', 58 for shutting off the cooling coils 31. It will be readily apparent that when valve 38 is closed and valve 28 open, that the circulating water will not pass through the engine and that when the valve 57' is closed and 58 is open, the said water will not pass through the cooling coil 31.

In order to supply further heat from the engine to the oil, I have shown the exhaust pipes 60 from each of the engine units, as passing through the oil reservoir. Said pipes may assume a circuitous course as indicated at 61 in Figs. 2 and 4, before finally merging into the common exhaust chimney 62. While I appreciate that this procedure might be dangerous with an ordinary Diesel or gasoline engine, on account of the high temperature of the exhaust; in my compound engine, the exhaust temperatures are much lower. Also, it will be understood that the area of the exhaust pipes exposed to the oil can be adjusted to the requirements of the locomotive, being increased or diminished, according to the climatic conditions and the grade of fuel found where the locomotive is to be operated. Also, I may provide means variably to by-pass the exhaust coils within the oil tank in warm weather. For this purpose, I have shown auxiliary exhaust pipes 64, (Fig. 4) leading around the oil tanks to the roof of the locomotive with valves 65 and 65' for directing the gases through either the pipes 64 or the pipes 60, as desired.

In my form of locomotive, facility and wide range of efficient speed control is offered, since not only may the motors be controlled by the usual resistances and series-parallel arrangement, but the generators may be likewise controlled and also the speed of the engines themselves regulated within wide limits, or any combination of the above controls. I wish it understood therefore, that the control illustrated in Fig. 6 and described hereinafter is merely typical of one system of control that I now propose to use and that this may be varied within wide limits within the scope of this invention.

In order to give the locomotive a large number of efficient running speeds, I prefer to control not only the motor circuits, but also the generators and their circuits from the master controller on the locomotive, and I also prefer to control from the same master controller, the engine speed. By doing so, not only do I simplify the work of the engineer so that he may give his entire time to watching the roadway, but I at once render possible the control of the engine from a distant point on the train, also. In addition, it also renders possible the coupling together of any required number of locomotives to handle the load and the operation of the same by one engineer as by multiple unit control.

Referring to Fig. 6, one of the master controllers is shown at 70. The controller illustrated has 9 points and 3 running positions.

In the diagram, the driving motors will be recognized at 23, 24, 25 and 26, the generators at 3 and 3', with their fields 71 and 72 separately excited by the auxiliary generator 57 driven suitably as by auxiliary heat engine set 56, hereinbefore described.

The motors are shown as controlled by the multiple unit system which is illustrated as excited from the low voltage constant potential generator 57, so that the heavy current from the main generators 3 and 3' does not pass through the master controllers.

The master controller 70 representative of all of the master controllers in the system is shown as operating the usual solenoids, A, B, C, D, E, F, G and H which control corresponding contactors A', B', C', D', E', F', G' and H'. Said contactors operate, it will be understood, to accelerate the engine uniformly and automatically by first placing the two motors of each pair in series with one another and in series with the resistance, gradually cutting out the resistance until point 5 is reached, where all resistance is cut out, then placing the motors in parallel when the process is repeated until the full running speed at point 9 is reached, or the four series arrangement may be used.

While a standard control has been illustrated for the motors, it will be readily understood from what follows that some, if not most of the resistance steps may be omitted owing to the variations in the impressed voltage of the generators, caused by the variations in their connections and speed.

For effecting this last named purpose, i. e., variations in the generator connections and speed, I have also shown on the master controller 70, an auxiliary section 75 which controls the solenoids I, J, K, L. Similarly to the first mentioned series of solenoids, the last mentioned series controls the contactors I', J', K' and L'. An inspection of the diagram will show that when contactors J' and K' are closed, the generators 3 and 3' will be connected in parallel and consequently furnish half voltage at full speed, while when contactor I' is closed and J' and K' open, the generators are connected in series and furnish full voltage at full speed. As the diagram shows, the connections between the generators may be changed from parallel to series at point 7 on the controller. The solenoid I on the other hand controls contactor I' in circuit with an engine speed controlling device, one form of which will now be described. Other forms of generator manipulation may be employed, if desired.

Each engine unit is shown as provided with two speed governors 76 and 77, the governor 77 being designed to hold the engine's speed down to about half or at idling speed, while the governor 76 is designed for control of the engine at full speed. The governors are shown as operating upon the valve lever 78 controlling the fuel admission through the rod 79. Said rod has two oppositely faced V shaped notches, 80 and 81. When said rod is in the position shown in Fig. 6, it will be raised up and down by the governor 76, through the lever 82 pivoted at 83, since at that time the pin 84 on said lever 82 rests in said notch. When, however, the lever is moved slowly clockwise slightly, the notch 80 will move away from pin 84 and the notch 81 will be advanced, so that pin 84' lies within the same. It will then be readily apparent that the rod 79 is under the control of the governor 77 through the lever 82' pivoted at 83. For controlling the position of said governor, I have shown solenoid 85, the armature of which is connected to the lower end of lever 79 through the stem 86. Said solenoid is in circuit with the contactor I', so that whenever the controller is moved so as to complete a circuit with the strip $i$, said solenoid will be excited. As shown, the circuit with the strip $i$ is completed at point 3 (Fig. 6) on the controller. When the solenoid is energized, the lever is moved to the right under retardation, placing the engine under the control of the high speed governor, and when the solenoid is de-energized, the lever is returned under the action of the spring 88, to place the engine under the low speed governor.

I also prefer to provide means for insuring efficient operation of the engines at all times. As is well known, more current is required to accelerate a train, say from 40 to 60 miles an hour, than to maintain the same train at either 40 or 60 miles an hour. If the generators are used in parallel I may meet this condition by utilizing coils 90, 90' in series with the main line which cut off one generator entirely and cut the engine down to idling speed, leaving the other unit operating the train as shown in Fig. 7. In this figure winding 90 holds switch 101 closed against the action of spring 102 as long as the current therethrough exceeds the capacity of generator 3. When, however, the current drops, the spring opens said switch and de-energizes solenoid 85, thereby reducing the engine unit 2 to idling speed. At the same time, winding 90' permits spring 102' to open switch 101', thereby opening the circuit of generator 3' of unit 2. In order to prevent temporary opening of either switch I' or 101 from slowing down the engine, I have shown a dash pot 122 for retarding the action of spring 88. Also switches 101 and 101', or either of them, may be of the delayed action type, if desired.

I prefer however, an arrangement which will give greater variation in the line voltage. The one-two motor or generator arrangement on the locomotive may be found most applicable to switching and other special work. For suburban and similar service where the quickest possible train acceleration is desired, the two changes which follow each other in series paralleling of motors, losing continuity of the power connection with each change is to be avoided. The continuous steady pull held as nearly as possible to the limit of adhesion of the drivers considering the rail condition at the moment is indispensable. This cannot be secured by the constant potential system, as has been pointed out, but rather from the controlled potential or controlled generator system, falling under two heads, the control or building up of the generator fields, holding the amperes supplied to the motors to the near-adhesion limit or controlling the generator speeds with or without the former, having the same object in view.

With the prime mover electric locomotive, we have a very unique opportunity to carry out these methods. Much better results can naturally be obtained by going to the source and suiting the power supply to the tractive needs, thus utilizing smooth and persistent acceleration, which is free from jerks and interruptions, and is a far more perfect system than the crude expedient of entirely interrupting the connection—usually occurring twice, so as to get a fresh grip on the situation in the form of new motor combinations. The constant potential method is crude and illogical as compared with the full manipulation of the power source, as is contemplated herein, especially when the power source is divided and gives opportunity for more complete manipulation.

It will be understood then that instead of connecting the generators first in parallel and then in series as shown in Fig. 6, one generator and engine only may be used, in place of the parallel connection, so that the second generator and engine is only thrown in when additional voltage is required. This form of connection is shown in Fig. 9, it being understood that the switches I', K", L" are designed to be operated from the contactor solenoids I, K and L as in Fig. 6 and switch 101" closed by coil 90" in series with generator 3'. The line voltage may be further varied by varying the fields 71', 72' of the generators as by field rheostats 200, 201 controlled preferably automatically through rods 79' as described hereinafter in connection with Fig. 10.

While this system would not give as great a starting torque as the system shown in Figs. 6 and 7, it would give all the torque the drivers will take without slipping, higher voltage than the system shown in Fig. 7 and greater fuel economy than the system shown in Fig. 7, since in starting, only one engine would be used. The adhesion is the controlling factor as to the available starting torque, in any event.

In Fig. 10, a further development of this idea is shown, which is especially designed for successive operation of the engines with a series connection for full speed. In this figure the fork 110 at point 111 on the floating link 112, serves to operate the governor rod 79' actuating the fuel lever 78' or a field rheostat 200 or 201 for the generator or generators, or any fundamental control element, for either engine or generator, the little fork 110 shown at this point can be understood as coming down on each side of the governor rod and controlling it. This floating link 112 is shown here as controlled by a main or derived current operating on solenoid 90''' as against the spring 115, the tension of which is made adjustable, as shown at 116. The link is also shown as controlled by an air cylinder 117 acting against a retractile spring 118. Back of the piston 118' of said cylinder is an oil reservoir 119, acting as a dashpot through a valve controlled aperture 120 connected with the oil reservoir 121 and the control valve being short-circuited by the check valve 122', allowing for quick action of the spring when the air side of the piston is released. A two way supply and exhaust valve 123 is shown in the pipe 123' connecting the cylinder 117 and air reservoir 124. Said valve is operated by the solenoid H from the master controller. It will be understood that a similar arrangement is provided for the other engine. Both solenoids H and H'' are operative from the controller. A contact 101''' is interposed in the circuit of the solenoids which is closed when the floating link 112 is clear back in the position where the engine is running full speed, and the current in solenoid 85'' tends to come down, due to further acceleration of the train, so that the next engine is thrown in, to build up the line voltage. This is accomplished by the closing of this contact 101''' thus energizing the solenoid H'' for the other engine. Switches 125 and 126 are provided to short circuit contact 101' either with respect to solenoid H or H''. The switches 125 and 126 are shown coupled so that one is closed when the other is open, and vice versa, thuse permitting of altering the engines as to which is first and which is second. When this hand operated connecting link 131 is detached at 130, then both switches may be closed so that under these conditions, both engines act simultaneously and alike in response to the solenoids instead of one after the other, or the other after the one, as provided for.

As above explained, in the system designed according to my invention, it is possible to control the engine from any point on the train, simply by providing a master controller on any car. The system therefore readily lends itself to suburban train service in which standard multiple unit controlled motor cars may be employed on a train, employing one or more of my locomotive units, more as a travelling power plant than as a locomotive. This idea is illustrated in Figs. 1 and 8. The locomotive 100 illustrated in Fig. 8 is somewhat smaller than that illustrated in Fig. 2, having only one generator 3'', which is coupled however, to three compound engine units, 8', 8'' and 8'''. Said locomotive is shown as provided with two driving motors 25' and 26', which may be located on the same truck 27'. Said motors may be of only sufficient capacity to haul the locomotive itself and a few trailers 90, 91 and 92. The additional capacity of the generator 3 is employed to operate the motors on the motor car units 90 and 94 of the train. It will be understood of course, that a motor car unit 94 is placed at the opposite end of the train from the locomotive unit, so that the train may be operated with equal facility from either end. If the train is long, it will be understood that a plurality of locomotive units 100 and 100' may be employed, as shown in Fig. 1.

In a train designed according to this modification, very quick starting may be accomplished, due to the tractive effort, not only of the locomotive itself, but also of all the motor cars on the train, so that this system is of special adaptation to high speed heavy suburban service. It is understood that substantially similar wiring may be employed on this unit as on the locomotive unit shown in Fig. 2, so that Fig. 6 represents both systems.

The operation of my locomotive in controlling a train is as follows. Assuming that the train is running at full speed between suburban stations, as it approaches the station, the engineer first cuts off the power by releasing the handle of his master controller. This automatically throws the engines into idling or half speed by the opening of the contactor I', and breaks the series connection between the generators. The engines thereupon drop into the control of the governors 76 and are held at this speed which may be called the idling speed, driving the generators at full field excitation from the exciter 57 and therefore impressing on the busses one-fourth full voltage in the design shown. If a 1200 volt system is employed, this will mean 300 volts on the busses at this time. The engineer, of course, also applies the brakes, bringing the train to rest. When the signal to start is received, the engineer simply turns his controller as he would on a standard electric locomotive or multiple unit train. The motor-generator connections are then manipulated automatically according to the current requirements, or by the controller, the motors being first in series with each other and perhaps with a resistance, and the generators in parallel. Neglecting the resistance, the voltage on each motor would be 150 in the example given. When the train gets up to say 8 miles per hour, the engine control is shifted from the low voltage governor to the high speed governor. The voltage on the busses increases at a predetermined rate, say to half full voltage or 600 volts and the voltage on each motor to 300 volts. As the engineer revolves his controller handle further, the connection between the motors may be changed to parallel, so that the motors are operated under full operative voltage (600 volts) which may or may not be reduced at first by resistance. As the rotation of the handle is continued, the connection between the generators may be changed from parallel to series, thereby impressing full voltage (1200) on the busses and as the resistance in series with the motors is cut out (if used) impressing full voltage on the motors, or this increase in voltage may be produced by engine speed control.

It will be understood of course, that the above cycle of operation may be greatly simplified, if desired, by omitting certain resistances, or omitting the series parallel connection between either the motors or generators or the duel engine control, if desired, thereby reducing the number of running points on the controller. The system may also be extended, if desired, to include cutting in and out one engine-generator set as the current and voltage requirements necessitate, or using engine speed control as explained.

It will also be understood that as shown in Fig. 7, instead of employing both locomotives in parallel when starting up, one engine may be employed and then both, the second engine not being started up until the first has reached full speed, and then being brought in gradually as by adjusting the action of cylinders 122, the angle of the notches 81, or by other means.

It will also be understood that I provide in my locomotive the usual emergency means for starting up the engine, in case the compressed air supply source fails and also for heating the water and fuel when the engine is in the round house. For the first named purpose, I have shown a valve 102 on tank 18 through which the supply tanks 17 and 18 may secure either brake or full pressure by the compressed air supply in the round house. As an alternative method, the generators 3 and 3' may be supplied with current to operate as motors and to turn over the engine for starting. To this end, a plug from a stationary generator or another locomotive may be connected to the standard plug 103 on the locomotive, which is normally used to connect the locomotive to a second locomotive, or to the train, for remote control, or the generators may be supplied with current from exciter 57 to start the engines. The air brake may be used for starting the engine as by the valved connection 22", (see Fig. 2).

As an auxiliary heating means for the fuel, I have shown auxiliary valves 104 and 105 (Fig. 4) which are designed to be connected to a circulating supply of hot water or steam in the round house, so that hot water or steam may be supplied to the system without lighting the burner 50, where such supply is available.

Thus a graduation or variable speed governing means for the engine may be employed in place of the plurality of governors or a larger number of speed steps may be used within the scope of this invention.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

1. In a combustion engine electric locomotive drive for trains, in combination, a locomotive and train cars, a combustion engine and generator on the locomotive, motors on said locomotive and a car of the train, electric circuits between said motors and generator whereby said motors are driven from said generator, and controllers on said locomotive and a car of the train adapted to control both the circuits between said generator and the said motors and the combustion engine.

2. In a combustion engine locomotive, driving motors, a plurality of combustion engine generator units for supplying the propelling medium to said driving motors, a common controller for the combustion engines, generators and motors having a plurality of running positions, one of which connects the generators in parallel, another of which positions connects the generators in series, and another of which positions varies the engine speed.

3. In a combustion engine electric locomotive drive for trains, in combination, a locomotive and train cars, a combustion engine and generator on the locomotive, motors on said locomotive and a car of the train adapted to be driven from said generator, a variable speed governor for the engine, a controller on both said locomotive and the train, and means thereon for controlling the speed of the combustion engine through said governor.

4. The method of governing the speed and draw-bar pull of a multiple combustion engine electric locomotive comprising a plurality of coupled combustion engines and generators, and driving motors adapted to be driven from one or more of said generators, which consists in performing the following functions in accelerating the locomotive; varying the voltage supply for the motors by (a) varying the speed of an engine and generator, (b) connecting another engine and generator in series with said first engine and generator, and (c) varying the connections between the motors within steps (a) and (b).

5. In a combustion engine electric locomotive, a plurality of power plants and driving motors, a master controller therefor, and means governed by said controller for throwing first one plant and then another into operation in series therewith to increase the voltage in accelerating the locomotive.

6. In a prime electric locomotive, the combination with driving motors, of an engine driven generator, a plurality of means for limiting the speed of the engine to different values, means for shifting from one limit speed to another for varying the voltage on the motors, and speed controlled means operable between said speed limits for effecting further voltage variations.

7. In a prime electric locomotive, the combination with driving motors, of an engine driven generator, a plurality of means for limiting the speed of the engine, means for shifting from one limit speed to another for varying the voltage on the motors and speed controlled means responsive to the current flowing and operable between said speed limits for effecting further voltage variation.

8. In a prime electric locomotive, the combination with driving motors, of an engine driven generator, a plurality of means for limiting the speed of the engine, means for shifting from one limit speed to another for varying the voltage on the motors and speed controlled means operable between said speed limits.

In testimony whereof I have affixed my signature.

ELMER A. SPERRY.